UNITED STATES PATENT OFFICE.

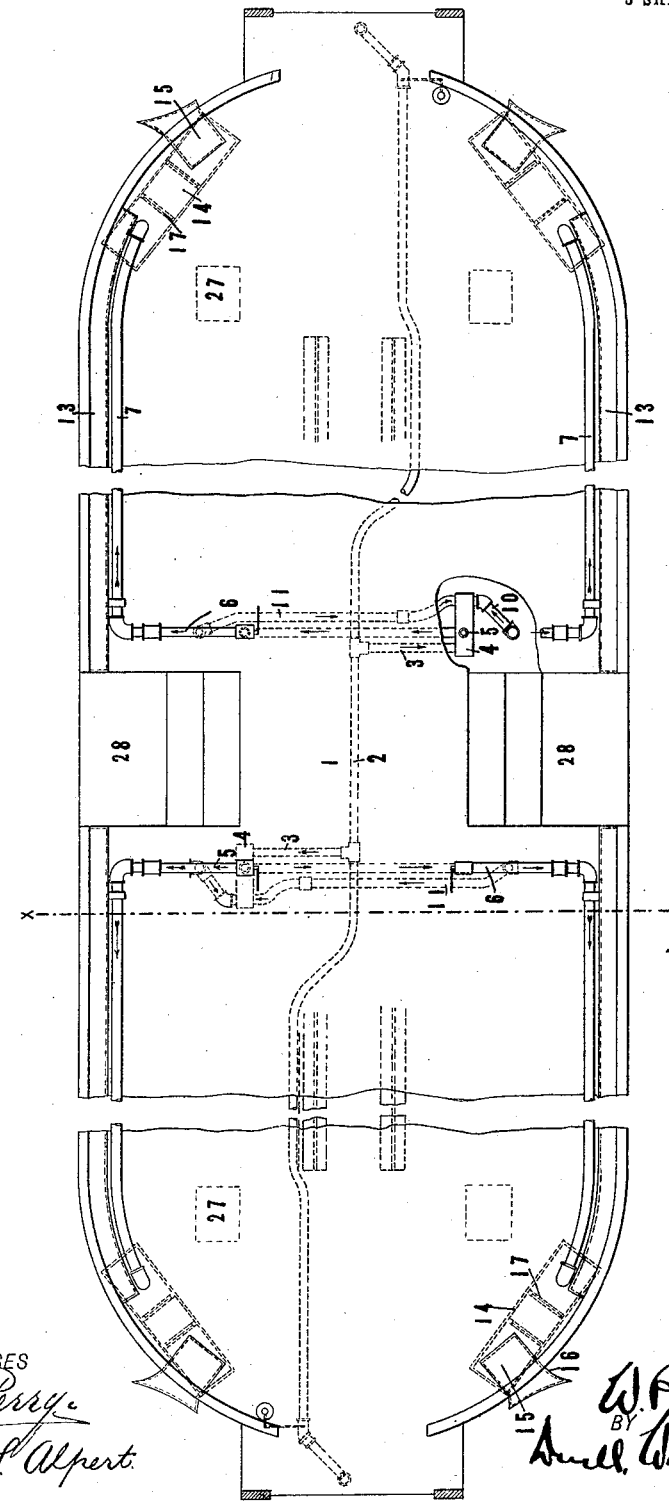

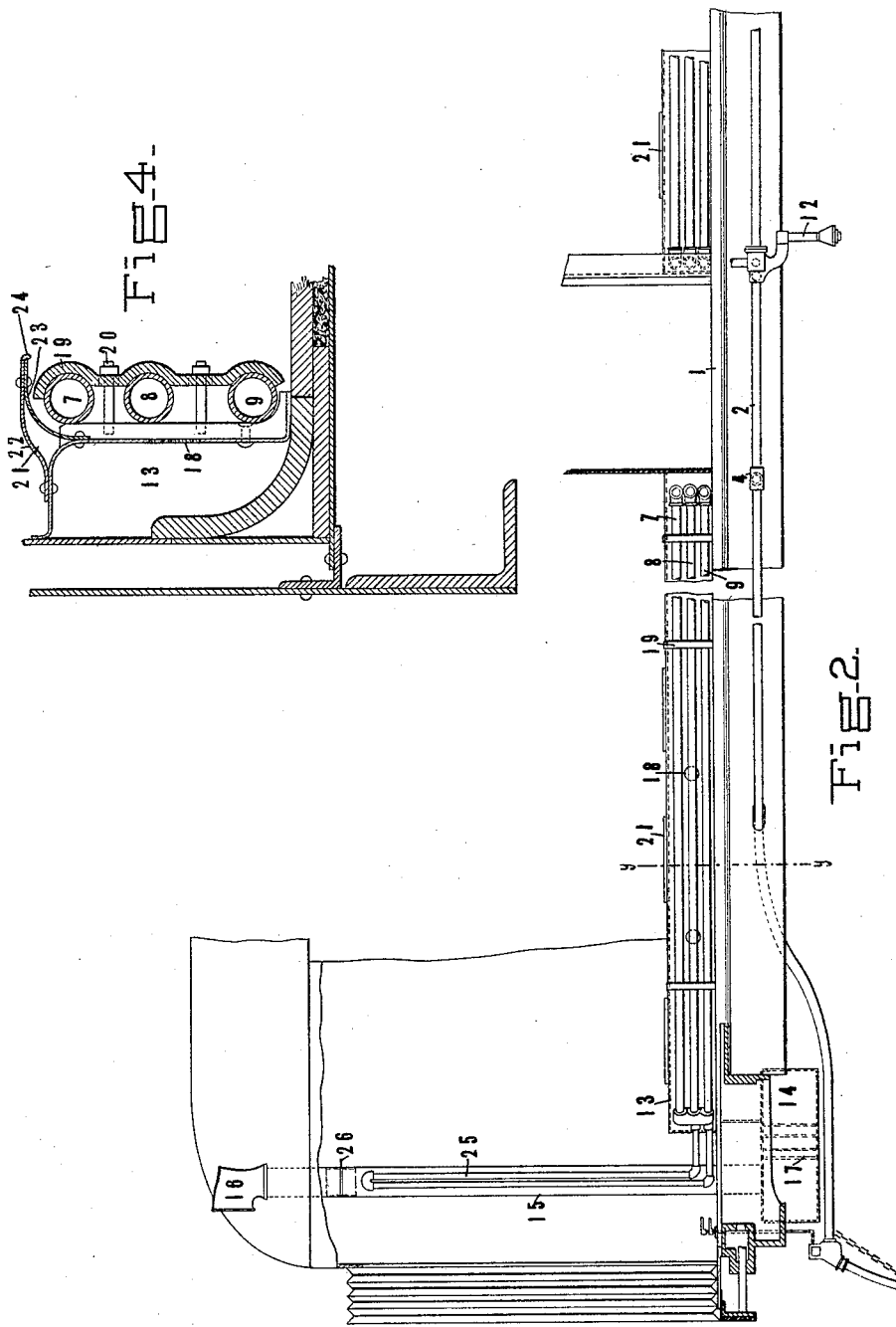

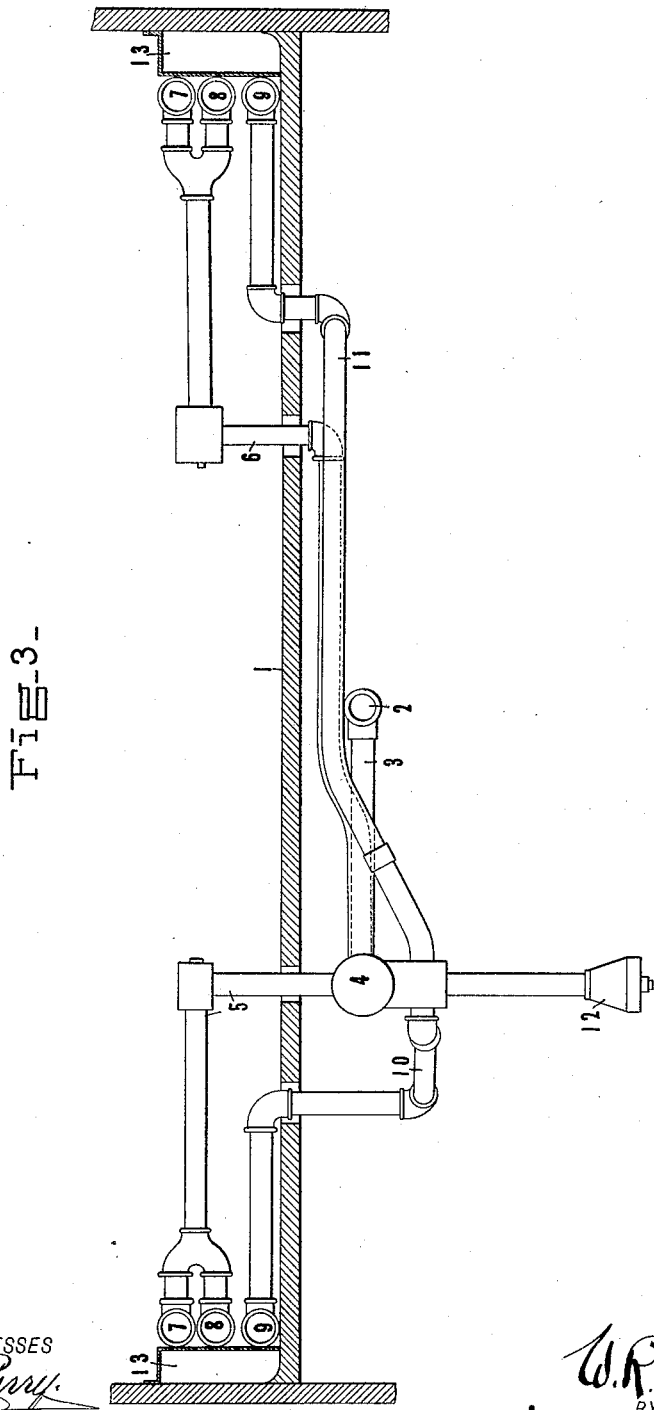

WILLIAM R. McKEEN, JR., OF OMAHA, NEBRASKA, ASSIGNOR TO McKEEN MOTOR CAR COMPANY, OF OMAHA, NEBRASKA, A CORPORATION OF NEW JERSEY.

CAR-HEATING APPARATUS.

1,113,457.

Specification of Letters Patent.

Patented Oct. 13, 1914.

Application filed August 7, 1907. Serial No. 387,456.

*To all whom it may concern:*

Be it known that I, WILLIAM R. MCKEEN, Jr., residing at Omaha, in the county of Douglas and State of Nebraska, have invented certain new and useful Improvements in Car-Heating Apparatus, of which the following is a full, clear, and exact description, such as will enable others skilled in the art to which it appertains to make and use the same.

This invention relates to car heating apparatus.

One of the objects thereof is to provide practical and efficient means for heating a car.

Another object is to provide means of the above type of such character and so used as to maintain a car in an efficiently ventilated condition.

Another object is to provide means of the type first mentioned in which the heated air or other agent is economically used and uniformly distributed.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the accompanying drawings wherein is shown one of various possible embodiments of this invention; Figure 1 is a plan, Fig. 2 is a partial elevation of parts shown in Fig. 1, Fig. 3 is a sectional view taken substantially on the line $x$—$x$ of Fig. 1 and showing the parts upon a larger scale, Fig. 4 is a detail cross section taken along the line $y$—$y$ of Fig. 2 and showing the parts on an enlarged scale.

Similar reference characters refer to similar parts throughout the several views.

As tending to a ready understanding of certain features of this invention, it may here be noted that by reason of the shape and often crowded character of a car body peculiar difficulties are experienced in heating the same. There is a tendency to heat to excess certain portions of the car whereas other portions are comparatively cold. Another difficulty experienced is in efficiently ventilating a structure of this character, especially in cold weather in which the heating is also to be considered. The above and other defects are overcome in structures of the nature of that hereinafter described.

Referring now to the accompanying drawings there is shown in Fig. 1 a car body 1 provided with a train pipe 2 which has connections 3 leading to regulators 4 from each of which the connections 5 and 6 supply steam pipes 7 and 8, best shown in Fig. 3 of the drawings. These pipes preferably run from points adjacent the center of the car at each side thereof to points adjacent the ends, and are connected with the return pipes 9 which lead as by the connections 10 and 11 to the traps 12. Running along the floor at each side of the car from the ends thereof are conduits 13 which are preferably formed as indicated in Fig. 3 of the drawings and terminate in dust collectors 14, Figs. 1 and 2, air being led to the latter devices from upright conduits 15 provided with hoods 16. These dust collectors, the specific construction of which forms no part of the present invention, are provided with screens 17, as of cloth, through which the incoming air from the conduits 15 is passed to the conduits 13 and by which all cinders, dirt and the like are separated therefrom. Along the sides of conduits 13 are formed openings 18 preferably one opposite each seat of the car.

As will be seen from the drawings the steam pipes 7, 8 and 9 are placed closely adjacent the sides of the conduits 13 and may be secured thereto as by brackets 19 and bolts 20 as shown in Fig. 4. Likewise secured adjacent the conduits 13 are footrests 21 best shown in Fig. 4 of the drawings. These foot-rests each comprise the upper member 22 riveted to the top of conduit 13 and a lower member 23 riveted to the side of the conduit and extending beneath member 22 and riveted thereto. The latter member thus forms a light and efficient support for the rest, the edge of the same terminating within the down-turned flange 24 of the upper member. These rests are preferably provided one for each seat and are of such length as to accommodate each seat without the waste of metal and labor attendant upon extending them to the inaccessible locations between the seat and the side wall.

By the arrangement of conduits and heating pipes shown and described I am enabled to make the conduits of sheet metal or other light material, the bottom and one side wall being formed by the car itself, and the conduit structure proper consequently taking up but very little space. The heating pipes being arranged in front of the exposed upright face of the conduit, effectively protect the same against being battered or bent out of shape by the feet or satchels of passengers, or by the brushes or other cleaning implements of the car cleaners. The foot rests serve not only as such, but likewise as deflectors to insure the direction of the heated air toward the middle of the car. The natural tendency of the air, initially warmed in the conduit and further warmed by its contact with the heating pipes, is to pass directly upward, and in the absence of some provision to insure its distribution over the car, is apt to pass directly to the top of the car, and to escape through the ventilators without having adequately contributed to the heating of the car. The foot rests further serve to prevent litter from finding its way down between the heating pipes and the air conduit. Finally, they offer considerable protection to the top of the conduit, materially lessening the danger of its becoming battered or injured by articles rested or dropped thereon. They thus serve not merely as foot rests, but as efficient aids in the direction and distribution of the heated air currents, and as protectors of the conduits.

In the upright conduits 15 there are preferably provided heating means as the steam pipes 25 which serve to temper the air before it is led to the conduits 13 thus rendering the action of the system more efficient. There is also provided a damper 26 by which the incoming air may be regulated in volume or entirely shut off if desired. The foul air is drawn from the car body, moreover, by roof ventilators of the suction type as indicated at 27.

The operation of the above described embodiment of this invention is substantially as follows. The heating pipes 7, 8 and 9 receive steam or other fluid whereby they are enabled to perform their functions, and it is to be noted that although many advantages are inherent in the construction shown, and particularly in the case of side entrance cars, nevertheless the heating elements may be of widely different character in so far as certain broad features of this invention are concerned. The conduits 13 extend throughout a large portion of the length of the car except at the side entrance 28, and the air is led to these passages through the upright conduits 15, being tempered if desired as by the heating pipes 25. After passing in purified condition through the conduits 13 it passes outwardly through the openings or ports 18 and is discharged at points adjacent each seat. This air supply, moreover, may be regulated by the damper 26 in order to accord with weather conditions. The foul air is drawn preferably by suction through the roof ventilators 27, thus insuring a steady stream of pure air of the desired temperature adjacent each seat. The foot-rests, moreover, are positioned exactly where required without extending to portions of the car where they would be unused and would merely interfere with the cleansing of the car as well as raise the cost of construction and maintenance.

By reason of the carrying of the air closely adjacent the pipes 7, 8 and 9, said pipes serve to impart heat thereto throughout its passage as well as while passing from the ports 18 directly over the pipes. If it is desired, moreover, to use the heating system without the use of the incoming air, the latter may be readily cut off by the damper 26, and if, on the other hand, as in summer, the heating system is unused, the ventilating system still acts efficiently. While the train is at rest, moreover, the heating pipes still keep the car in warm condition by direct radiation, even though the supply of incoming air be at that time much reduced.

It is quite important that thin sheet metal be used for the formation of the inclosing wall of fresh air conduit 13, in order that heat may be readily conducted or transmitted from the heating pipes within the car to the air in said conduit, and that a large heating area for such preliminary heating of the air in the conduit be produced without occupying undue car space. Sheet metal occupies the least practicable space, and permits the ready transmission of heat, but being light, requires protection at all exposed points, hence the arrangement of the heating pipes in front of it and the placing of the foot rests above it contributes to the practicability and efficiency of the complete structure or combination, the foot rests serving the additional purpose of throwing the heat toward the middle of the car, or distributing it throughout the interior of the car. It is particularly to be noted, also, that there is no air inlet into the car when the doors and windows are closed, save such as is afforded by the ports or openings 18, and that there is no outlet for air except at the roof of the car. It hence follows that the heated air is thoroughly diffused or distributed throughout the car, and gives off its heat before escaping through the ventilators 27. It is obvious that were the ventilating or exhaust openings in proximity to the heating pipes, or to the inlets through which the air enters the interior of the car, the heated air would be rapidly and in great degree, withdrawn from the car without delivering its heat within the car. The character of the conduit and the relative location of the heating pipes with reference thereto, the position of the foot rests which serve as deflectors for the heated air, and the placing of the ventilators or foul air outlets in the ceiling or roof of the car, are all matters of importance and material to the attainment of the results sought.

It will thus be seen that there is provided apparatus in which the several objects of this invention are achieved and the above, among other advantages, present. The car is maintained efficiently ventilated under all conditions of weather or running and in cold weather is uniformly and economically heated to precisely the desired degree. The construction is simple and inexpensive and the entire apparatus is reliable and economical, and well adapted to meet the conditions of practical use.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent is:

1. In car heating apparatus, in combination, a flat air conduit extending from the floor of the car upward adjacent the inner wall of the car, and formed by a thin sheet metal wall rising from the floor and extending to the wall of the car; an air intake pipe communicating with said conduit; heating pipes extending substantially parallel with and in close proximity to the exposed upright face of said conduit; openings formed in said upright wall of the conduit in proximity to the heating pipes; and ventilators communicating with the interior of the car at the roof or ceiling thereof.

2. In car heating apparatus, in combination, a sheet metal air conduit leading along the floor of the car adjacent one of the side walls thereof, and provided with outlets in its exposed wall, heating pipes arranged parallel with and in proximity to the exposed upright wall of the conduit, and serving at once to heat the air within and escaping from said conduit and to protect the conduit against injury, and foot rests mounted upon said conduit and overhanging the heating pipes, whereby they are adapted to direct the heated air toward the middle of the car.

3. In car heating apparatus, in combination, an air downtake leading from the roof of the car downward to the floor thereof; heating means within the downtake and serving to temper the air passing through the same; an air conduit leading from said downtake along the floor of the car adjacent to one of the side walls thereof, said conduit being provided with openings; and heating pipes extending parallel with and in proximity to said conduit, and in position to impart heat to the air within the conduit and escaping through the openings in the wall thereof.

4. In car heating apparatus, in combination, a sheet metal air conduit extending along the floor of the car adjacent one of the walls thereof, and provided with outlets in its upright wall; heating pipes mounted closely adjacent the side of said conduit and extending along the same; and a combined foot rest and deflector mounted upon said conduit adjacent each seat of the car, said foot rest being formed to overhang said heating pipes and to serve as a protection against contact therewith, and also as a means of directing the warmed air inward from the side walls of the car.

5. In car heating apparatus, in combination, a sheet metal member extending along the floor of the car adjacent a side wall thereof and having its upper portion extending substantially to the side wall and its lower portion substantially to the floor whereby there is provided an air conduit, said conduit being provided with an air inlet, a sheet metal foot-rest extending upwardly and outwardly from said conduit, and heating means extending along said conduit beneath said foot-rest, said conduit being provided with openings adapted to discharge air toward said heating means.

6. In car heating apparatus, in combination, an air conduit comprising a sheet metal element secured at its upper edge to the wall of the car and extending outwardly and thence downwardly and secured to the floor of the car, said air conduit being provided with openings to discharge air into the car, and means external to the conduit and opposite the openings adapted to heat the air discharged by said conduit into the car.

7. In car heating apparatus, in combination, air conduit comprising a sheet metal element secured at its upper edge to the wall of the car and extending outwardly and thence downwardly and secured to the floor of the car, said air conduit being provided with an air inlet and with openings to discharge air into the car; means extending parallel with and in proximity to the conduit and across the discharge openings thereof, adapted to heat the air discharged by said conduit into the car; and a sheet metal foot-rest having a portion secured to the upper portion of said conduit, and a bracing portion secured to the upright portion of said conduit.

8. In car heating apparatus, in combination, an air conduit comprising a sheet metal element secured at its upper edge to the wall of the car and extending outwardly and thence downwardly and secured to the floor of the car, said conduit being provided with an air inlet and with openings to discharge air into the car; means adapted to heat the air discharged by said conduit into the car, said means extending parallel with and in proximity to the conduit and across its discharge openings; and a sheet metal foot-rest having a portion secured to the upper portion of said conduit, and a bracing portion secured to the upright portion of said conduit, said foot-rest being formed to extend over said heating means.

In testimony whereof I affix my signature in the presence of two witnesses.

WILLIAM R. McKEEN, Jr.

Witnesses:
H. P. VAN ARSDALE,
C. P. BURNAP.